(12) United States Patent
Bandarupalli et al.

(10) Patent No.: US 12,289,365 B2
(45) Date of Patent: *Apr. 29, 2025

(54) SYSTEMS, METHODS, AND APPARATUSES FOR DYNAMICALLY DETERMINING DATA CENTER TRANSMISSIONS BY IMPLEMENTING LOAD BALANCERS IN AN ELECTRONIC NETWORK

(71) Applicant: BANK OF AMERICA CORPORATION, Charlotte, NC (US)

(72) Inventors: Jagadish Babu Bandarupalli, St. Johns, FL (US); Terry Lynn Miller, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,017

(22) Filed: Nov. 20, 2023

(65) Prior Publication Data

US 2024/0251011 A1 Jul. 25, 2024

Related U.S. Application Data

(63) Continuation of application No. 18/100,125, filed on Jan. 23, 2023, now Pat. No. 11,895,182.

(51) Int. Cl.
*H04L 12/24* (2006.01)
*H04L 29/08* (2006.01)
(Continued)

(52) U.S. Cl.
CPC ............ *H04L 67/101* (2013.01); *H04L 43/08* (2013.01)

(58) Field of Classification Search
CPC ....... H04L 67/101; H04L 43/08; H04L 12/24; H04L 29/08
(Continued)

(56) References Cited

U.S. PATENT DOCUMENTS 9,088,502 B2 7/2015 Thubert et al.
9,143,493 B2 9/2015 Chaudhry
(Continued)

FOREIGN PATENT DOCUMENTS

CN 102113274 A 6/2011
CN 105264865 A 1/2016
(Continued)

*Primary Examiner* — Jude Jean Gilles
(74) *Attorney, Agent, or Firm* — Moore & Van Allen PLLC; Lauren M. Stokes

(57) ABSTRACT

Systems, computer program products, and methods are described herein for dynamically determining data center transmissions by implementing load balancers in an electronic network. The present invention is configured to receive data associated with at least one available data center, wherein the at least one available data center is associated with a primary network; receive a data transmission; upload the data transmission to a demilitarized zone (DMZ); apply the data transmission to the DMZ load balancer to generate a demilitarized data transmission (DMZ data transmission); determine an available primary internal network of the primary network; transmit the DMZ data transmission to the available primary internal network; apply the DMZ data transmission to the primary internal network load balancer to generate a primary internal network data transmission; determine a selected data center from the least one available data center; and transmit the primary internal network data transmission to the selected data center.

20 Claims, 6 Drawing Sheets

(51) Int. Cl.
  *H04L 43/08* (2022.01)
  *H04L 67/101* (2022.01)
(58) Field of Classification Search
  USPC .......................................................... 709/224
  See application file for complete search history.

(56) References Cited

U.S. PATENT DOCUMENTS

| | | | |
|---|---|---|---|
| 9,467,290 | B2 | 10/2016 | Vanheyningen et al. |
| 9,722,934 | B2 | 8/2017 | Muniraju |
| 9,736,234 | B2 | 8/2017 | Hopen et al. |
| 9,979,657 | B2 | 5/2018 | Batrouni et al. |
| 10,027,588 | B2 | 7/2018 | Thibeault et al. |
| 10,146,593 | B2 | 12/2018 | Gong et al. |
| 10,498,611 | B1 | 12/2019 | Kloberdans et al. |
| 10,757,600 | B2 | 8/2020 | Beale |
| 10,944,769 | B2 | 3/2021 | Singh |
| 11,160,000 | B2 | 10/2021 | Kim et al. |
| 11,709,804 | B1* | 7/2023 | Korepanov ............ G06F 16/183 707/822 |
| 11,895,182 | B1* | 2/2024 | Bandarupalli ........ H04L 67/101 |
| 2006/0031536 | A1* | 2/2006 | Eydelman ........... H04L 65/1104 709/228 |
| 2006/0098583 | A1* | 5/2006 | Baker ................... H04L 41/024 370/252 |
| 2008/0025230 | A1* | 1/2008 | Patel ................... H04L 41/5022 370/252 |
| 2009/0138592 | A1* | 5/2009 | Overcash ............ H04L 63/1425 709/224 |
| 2016/0323145 | A1 | 11/2016 | Anderson et al. |
| 2016/0373372 | A1 | 12/2016 | Gillon et al. |
| 2018/0054458 | A1* | 2/2018 | Marck ................. H04L 63/1458 |
| 2018/0115482 | A1 | 4/2018 | Kelley, Jr. |
| 2018/0295033 | A1 | 10/2018 | Madimirskiy et al. |
| 2019/0089673 | A1 | 3/2019 | Berhorst, II |
| 2020/0014659 | A1 | 1/2020 | Chasman et al. |
| 2020/0119952 | A1 | 4/2020 | Mayya et al. |
| 2021/0105221 | A1 | 4/2021 | Malloy et al. |
| 2021/0233163 | A1* | 7/2021 | Tosmur .................. G06Q 40/02 |
| 2021/0266290 | A1* | 8/2021 | Batouq ................. H04L 63/029 |
| 2022/0180345 | A1* | 6/2022 | Tosmur ............. G06Q 20/4037 |
| 2022/0215948 | A1* | 7/2022 | Bardot ................... G16H 40/40 |

FOREIGN PATENT DOCUMENTS

| | | |
|---|---|---|
| CN | 105308929 B | 2/2016 |
| CN | 105308930 A | 2/2016 |
| CN | 105308931 A | 2/2016 |
| CN | 107645444 A | 1/2018 |
| EP | 2327024 B1 | 12/2017 |
| JP | 6445621 B2 | 12/2018 |

* cited by examiner

SYSTEMS, METHODS, AND APPARATUSES FOR DYNAMICALLY DETERMINING DATA CENTER TRANSMISSIONS BY IMPLEMENTING LOAD BALANCERS IN AN ELECTRONIC NETWORK

CROSS-REFERENCE TO RELATED APPLICATION(S)

This application is a continuation application of and claims priority to U.S. patent application Ser. No. 18/100,125 filed on Feb. 23, 2023 and of the same title; the contents of which are also incorporated herein by reference.

FIELD OF THE INVENTION

The present invention embraces a system, method, and apparatus for dynamically determining data center transmissions by implementing load balancers in an electronic network.

BACKGROUND

Managers of an electronic network, such as electronic networks associated with a distributed network, have a harder time than ever managing data transmissions to a plurality of data centers within each network of the distributed network. Similarly, managers of the electronic network may have a difficult time managing data transmissions to the data centers when such data centers may already be overloaded, overburdened, have high processing times (e.g., slow processing speeds for incoming data transmissions), have data centers which are down for updating, and/or the like. Thus, there exists a need for a system to accurately, efficiently, and dynamically manage data transmission and determine data center transmissions within an electronic network.

Applicant has identified a number of deficiencies and problems associated with for dynamically determining data center transmissions by implementing load balancers in an electronic network. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamically determining data center transmissions by implementing load balancers in an electronic network. In some embodiments, the system may comprise a memory device with computer-readable program code stored thereon; at least one processing device operatively coupled to the at least one memory device and the at least one communication device, wherein executing the computer-readable code is configured to cause the at least one processing device to: receive data associated with at least one available data center, wherein the at least one available data center is associated with a primary network; receive a data transmission, wherein the data transmission is associated with a data center of the primary network; upload the data transmission to a demilitarized zone (DMZ), wherein the DMZ comprises a demilitarized zone load balancer (DMZ load balancer) of the primary network; apply the data transmission to the DMZ load balancer to generate a demilitarized data transmission (DMZ data transmission); determine, by the DMZ load balancer, an available primary internal network of the primary network; transmit the DMZ data transmission to the available primary internal network, wherein the available primary internal network comprises a primary internal network load balancer; apply the DMZ data transmission to the primary internal network load balancer to generate a primary internal network data transmission; determine, by the primary internal network load balancer, a selected data center from the least one available data center; and transmit the primary internal network data transmission to the selected data center.

In some embodiments, the selected data center is determined based on a number of current data transmissions for a plurality of data centers associated with the primary network. In some embodiments, the processing device may further be configured to: receive data associated with the current data transmissions for each data center of the plurality of data centers; compare the data associated with the current data transmissions; and determine, based on the comparison of the data associated with the current data transmissions, the selected data center, wherein the selected data center comprises a lowest number of current data transmissions.

In some embodiments, the primary network is associated with a primary entity.

In some embodiments, the primary network and a secondary network are part of a distributed network. In some embodiments, the secondary network comprises a secondary internal network and a secondary demilitarized zone (secondary DMZ). In some embodiments, the secondary DMZ comprises a secondary demilitarized zone load balancer (secondary DMZ load balancer) and wherein the secondary internal network comprises a secondary internal network load balancer. In some embodiments, the secondary network is associated with a secondary entity.

In some embodiments, the receipt of data associated with the at least one available data center associated with the primary network is received after the DMZ data transmission is generated. In some embodiments, the selected data center is determined before the application of the DMZ data transmission to the primary internal network load balancer.

In another aspect, a computer program product for dynamically determining data center transmissions is provided. In some embodiments, the computer-program product may comprise at least one non-transitory computer-readable medium having computer-readable program code portions embodied therein, the computer-readable program code portions which when executed by a processing device are configured to cause a processor to: receive data associated with at least one available data center, wherein the at least one available data center is associated with a primary network; receive a data transmission, wherein the data transmission is associated with a data center of the primary network; upload the data transmission to a demilitarized zone (DMZ), wherein the DMZ comprises a demilitarized zone load balancer (DMZ load balancer) of the primary network; apply the data transmission to the DMZ load balancer to generate a demilitarized data transmission (DMZ data transmission); determine, by the DMZ load balancer, an available primary internal network of the primary network; transmit the DMZ data transmission to the available primary internal network, wherein the available primary internal network comprises a primary internal network load balancer; apply the DMZ data transmission to the primary internal network load balancer to generate a primary internal network data transmission; and determine, by the primary internal network load balancer, a selected data center from the least one available data center; and transmit the primary internal network data transmission to the selected data center.

In some embodiments, the selected data center is determined based on a number of current data transmissions for a plurality of data centers associated with the primary network. In some embodiments, the processing device is configured to cause the processor to: receive data associated with the current data transmissions for each data center of the plurality of data centers; compare the data associated with the current data transmissions; and determine, based on the comparison of the data associated with the current data transmissions, the selected data center, wherein the selected data center comprises a lowest number of current data transmissions.

In some embodiments, the receipt of data associated with the at least one available data center associated with the primary network is received after the DMZ data transmission is generated. In some embodiments, the selected data center is 5 determined before the application of the DMZ data transmission to the primary internal network load balancer.

In another aspect, a computer-implemented method for dynamically determining data center transmissions is provided. In some embodiments, the computer-implemented method may comprise: receiving data associated with at least one available data center, wherein the at least one available data center is associated with a primary network; receiving a data transmission, wherein the data transmission is associated with a data center of the primary network; uploading the data transmission to a demilitarized zone (DMZ), wherein the DMZ comprises a demilitarized zone load balancer (DMZ load balancer) of the primary network; applying the data transmission to the DMZ load balancer to generate a demilitarized data transmission (DMZ data transmission); determining, by the DMZ load balancer, an available primary internal network of the primary network; transmitting the DMZ data transmission to the available primary internal network, wherein the available primary internal network comprises a primary internal network load balancer; applying the DMZ data transmission to the primary internal network load balancer to generate a primary internal network data transmission; and determining, by the primary internal network load balancer, a selected data center from the least one available data center; and transmitting the primary internal network data transmission to the selected data center.

In some embodiments, selected data center is determined based on a number of current data transmissions for a plurality of data centers associated with the primary network. In some embodiments, the computer-implemented method may further comprise: receiving data associated with the current data transmissions for each data center of the plurality of data centers; comparing the data associated with the current data transmissions; and determining, based on the comparison of the data associated with the current data transmissions, the selected data center, wherein the selected data center comprises a lowest number of current data transmissions.

In some embodiments, the receipt of data associated with the at least one available data center associated with the primary network is received after the DMZ data transmission is generated. In some embodiments, the selected data center is determined before the application of the DMZ data transmission to the primary internal network load balancer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
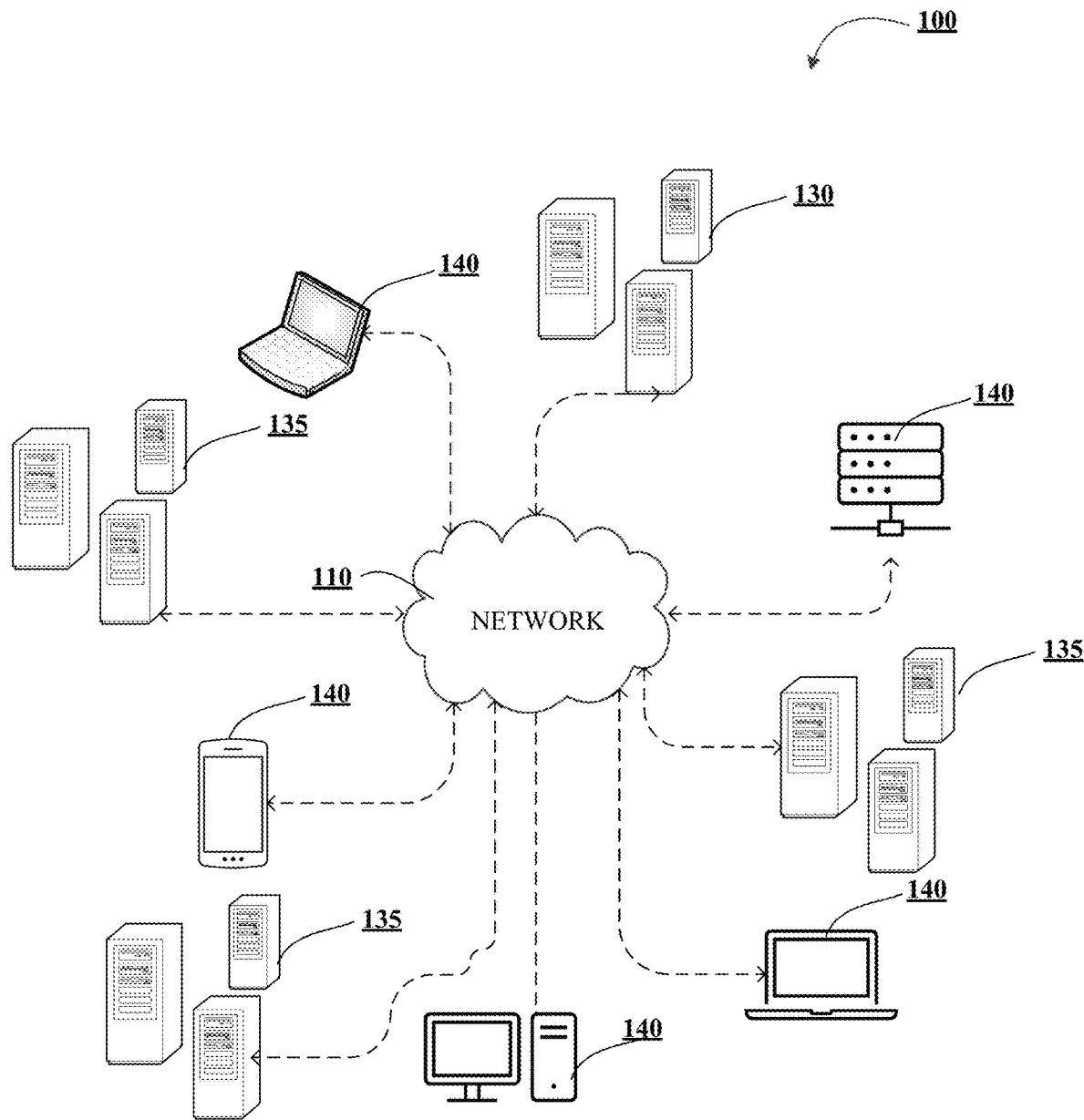
Figure 1B:
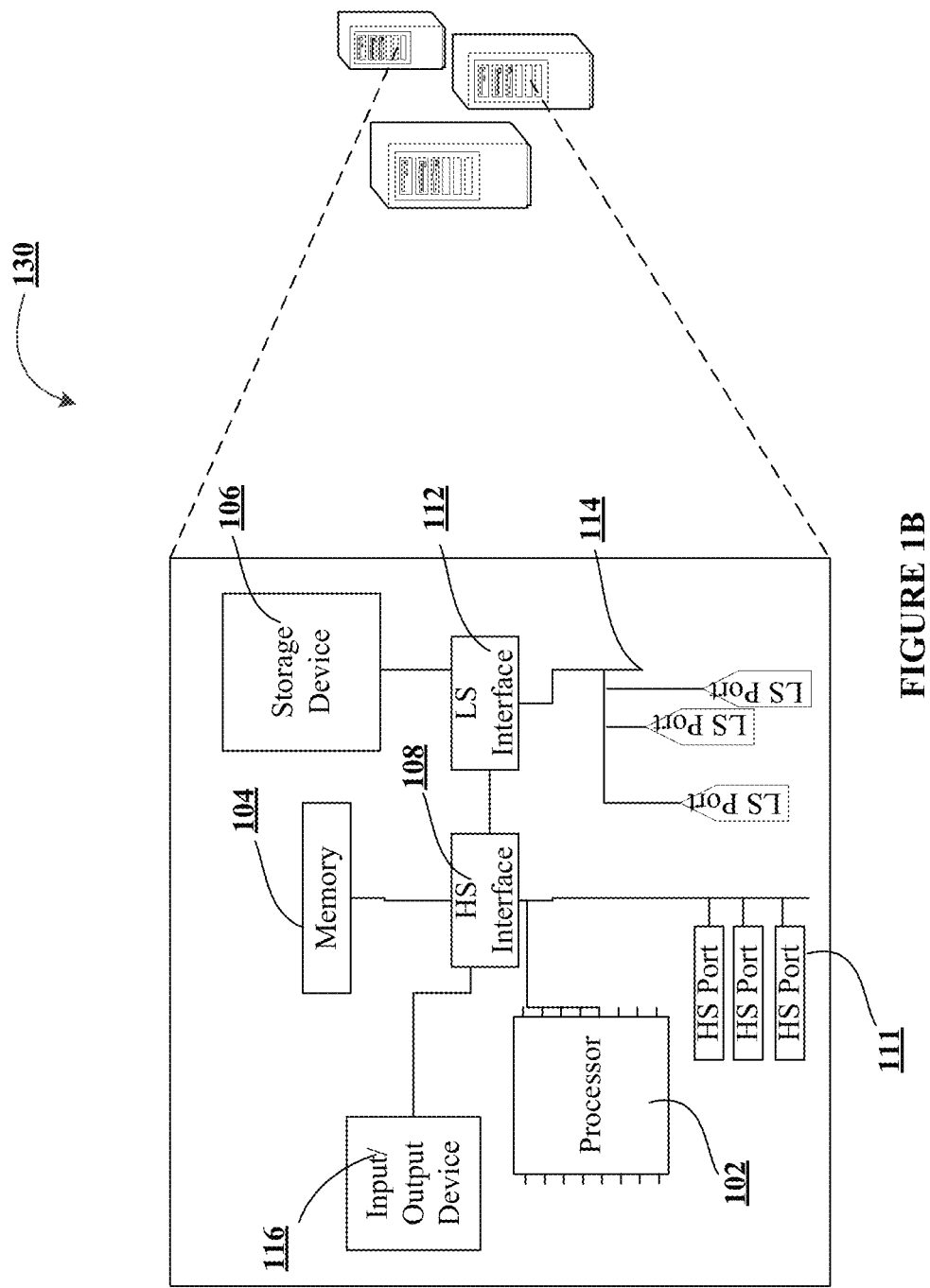
Figure 1C:
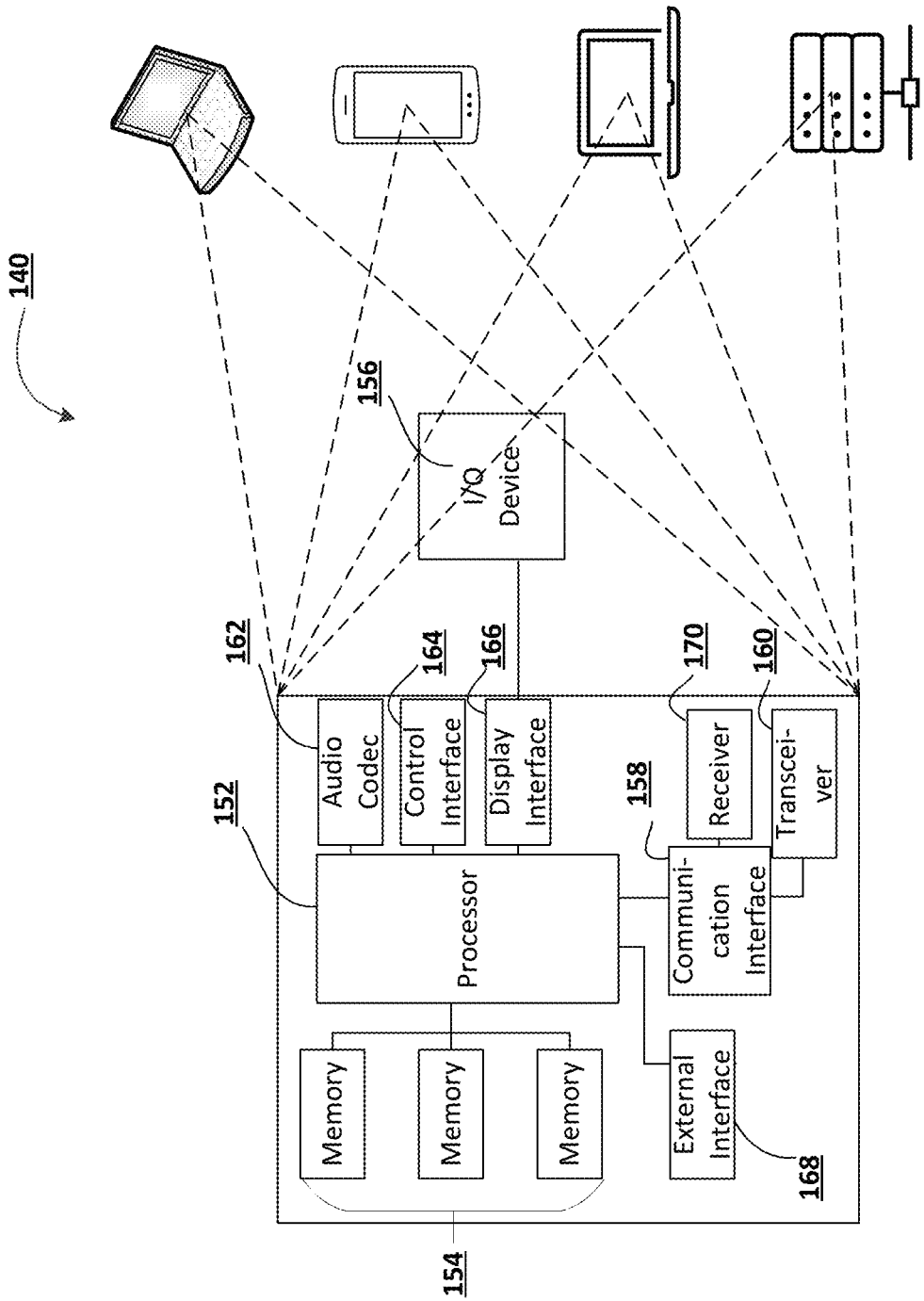
Figure 2:
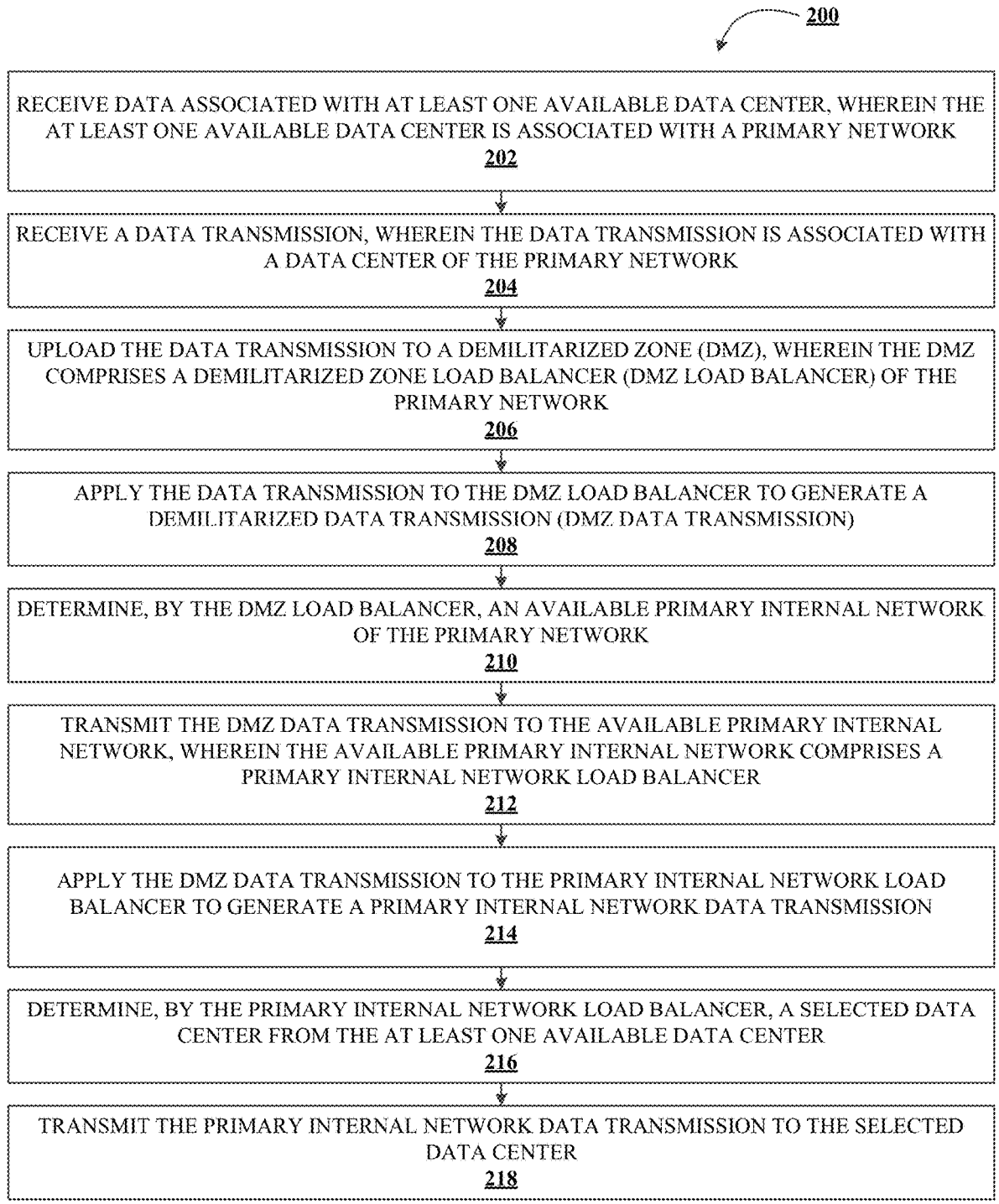
Figure 3:
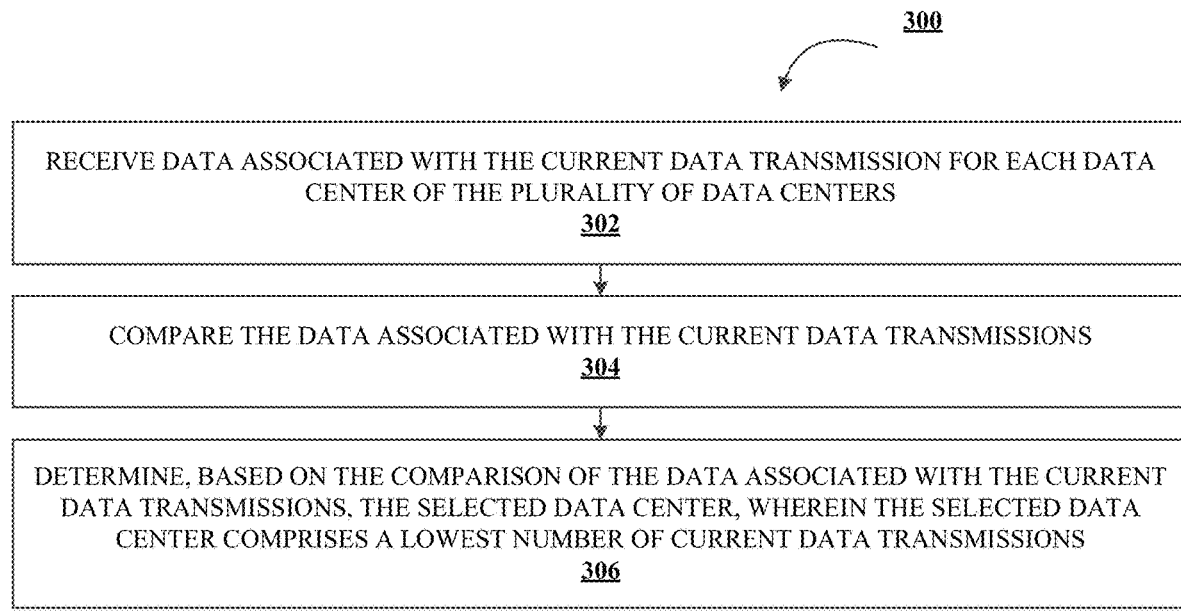
Figure 4:
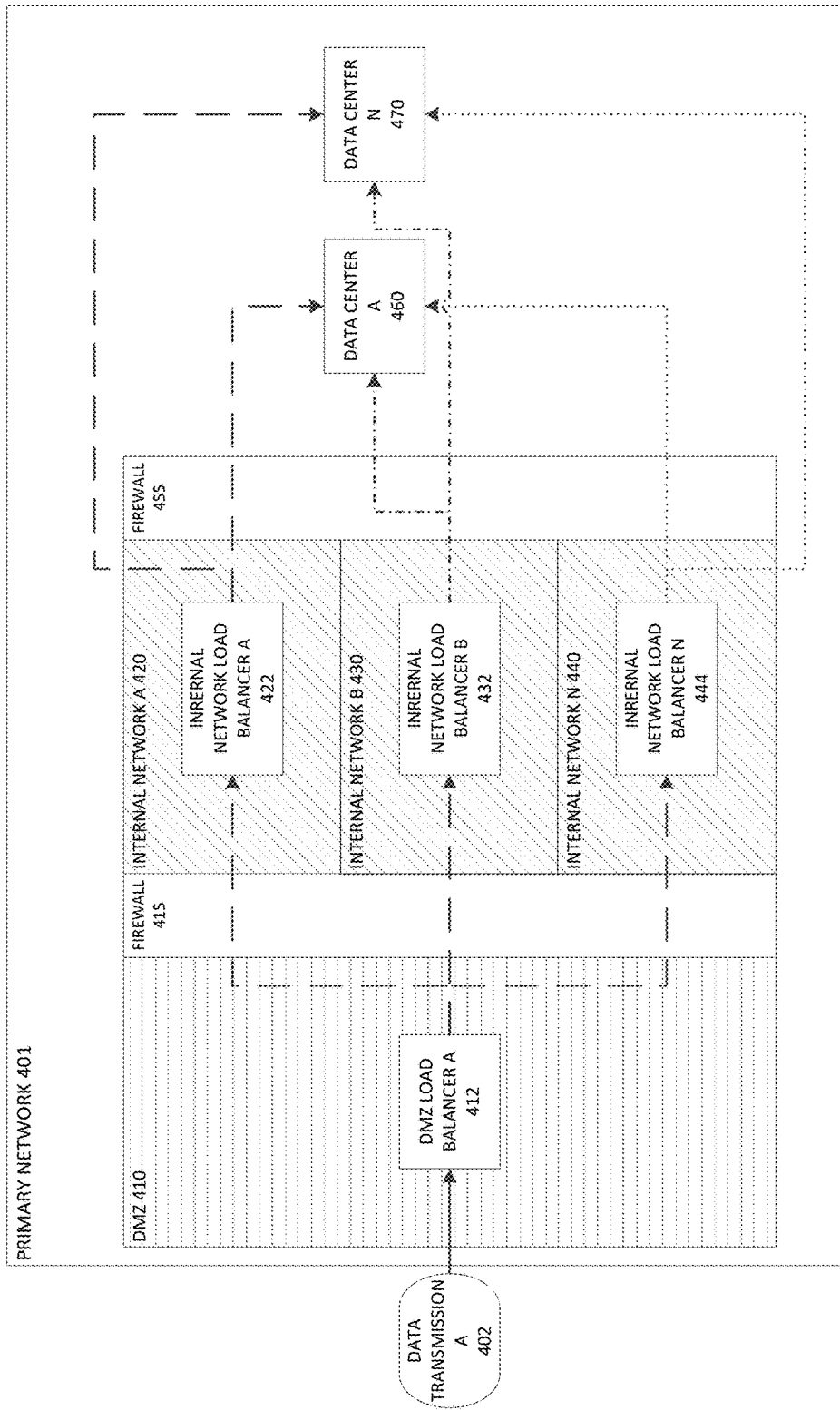

Having thus described embodiments of the invention in general terms, reference will now be made the accompanying drawings, wherein:

FIGS. 1A-1C illustrates technical components of an exemplary distributed computing environment for dynamically determining data center transmissions by implementing load balancers in an electronic network, in accordance with an embodiment of the invention;

FIG. 2 illustrates a process flow for dynamically determining data center transmissions by implementing load balancers, in accordance with an embodiment of the invention;

FIG. 3 illustrates a process flow 300 for determining the selected data center, in accordance with an embodiment of the invention; and FIG. 4 illustrates an exemplary block diagram 400 of an exemplary computing environment for dynamically determining data center transmissions by implementing load balancers in an electronic network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Managers of electronic networks, such as an electronic network of a distributed network, have a harder time than ever accurately, efficiently, and dynamically managing data transmissions and determining which data center to transmit the data transmission to. Further still, such managers have a difficult time dynamically managing the transmission of the data efficiently, such that the data itself does not need to be modified or changed (e.g., the logic of the data does not need to be changed, the data center identifier(s) in the data transmission do not have to be modified, and/or the like). A need, therefore, exists for a system to accurately, efficiently, and dynamically manage data transmissions and determine available data centers to transmit the data, in real-time.

As described in further detail herein, the present invention provides a solution to the above-referenced problems in the field of technology by generating a system (i.e., a data center transmission system) to accurately, efficiently, and dynamically manage data transmissions and determine data centers for the data transmissions. Such a system solves at least the technical problems by receiving data associated with the data centers of an electronic network (such as a primary network), whereby such data may comprise the current data transmissions of each data center. The system may further receive a data transmission to the electronic network (e.g., the primary network), where the data transmission may identify an intended data center of the electronic network for the transmission. The system may further upload the data transmission to a demilitarized zone (DMZ) of the electronic network, wherein such the DMZ may comprise a DMZ load balancer which may be applied to the data transmission in the DMZ to generate a demilitarized data transmission (DMZ data transmission). The system may further determine, based on the DMZ load balancer, an available primary internal network (e.g., an internal network that may immediately process the data transmission and/or an internal network that can process the data transmission the quickest of a plurality of internal networks), where the available primary internal network may comprise a primary internal network load balancer which can be applied to the DMZ data transmission to determine an available data center (i.e., a selected data center) and to generate a primary internal network data transmission to transmit to the available data center.

Accordingly, the present disclosure for the data center transmission system works by receiving data associated with at least one available data center, wherein the at least one available data center is associated with a primary network; and receiving a data transmission, wherein the data transmission is associated with a data center of the primary network. The data center transmission system may further work by uploading the data transmission to a demilitarized zone (DMZ), wherein the DMZ comprises a demilitarized zone load balancer (DMZ load balancer) of the primary network; applying the data transmission to the DMZ load balancer to generate a demilitarized data transmission (DMZ data transmission); and determining, by the DMZ load balancer, an available primary internal network of the primary network. The data center transmission system may further comprise transmitting the DMZ data transmission to the available primary internal network, wherein the available primary internal network comprises a primary internal network load balancer; applying the DMZ data transmission to the primary internal network load balancer to generate a primary internal network data transmission; determining, by the primary internal network load balancer, a selected data center from the least one available data center; and transmitting the primary internal network data transmission to the selected data center.

What is more, the present invention provides a technical solution to a technical problem. As described herein, the technical problem includes the management of data transmissions and determination of data centers to transmit the data transmissions, without changing the logic and/or data itself of the data transmission, such as without changing the data center identifier of the original data transmission. The technical solution presented herein allows for a data center transmission system that provides the accurate, efficient, and dynamic management of the data transmissions and determination of a recipient data center for the data transmission. In particular, the data center transmission system is an improvement over existing solutions to the management and data center determination for data transmissions identified herein, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamically determining data center transmissions by implementing load balancers in an electronic network 100, in accordance with an embodiment of the invention. As shown in FIG. 1A, the distributed computing environment 100 contemplated herein may include a system 130 (i.e., a data center transmission system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, data center/datacenter, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

In some embodiments, and as shown as data center/datacenters 135, the system 130 may be in communication with at least one data center 135 and/or a plurality of data centers 135, which are each in turn in communication with at least one user device(s) 140. Such data centers 135 may represent various forms of servers, such as web servers, database servers, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned. Such data centers 135 may be configured to process, store, and/or disseminate received data transmissions. In some embodiments, the data centers 135 may be part of a distributed network, such as a peer-to-peer resource sharing distributed network, whereby users and/or entities may transmit data requesting and/or submitting resource transactions or resource distributions across a distributed network and each data center 135 may, in turn, be part of a particular network associated with a particular entity (such as a financial institution) and each data center may be protected by various firewalls, demilitarized zone(s), and internal network(s), within each network for each entity. In this manner, the data centers 135 of FIG. 1A may be represented as electronic networks, whereby each electronic network further comprises at least one data center to receive each data transmission regarding resource transactions and distributions, and/or the like.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130 (and in some embodiments, data center 135), in accordance with an embodiment of the invention. As shown in FIG. 1B, the system 130 (and data center 135) may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 (and data center 135) may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof. As will be understood by a person of skill in the art, each of the components, hardware, and software herein described with respect to system 130 may be used within each data center 135 herein described.

FIG. 2 illustrates a process flow 200 for dynamically determining data center transmissions by implementing load balancers, in accordance with an embodiment of the invention. In some embodiments, a system (e.g., similar to one or more of the systems described herein with respect to FIGS. 1A-1C) may perform one or more of the steps of process flow 200. For example, a data center transmission system (e.g., the system 130 described herein with respect to FIG. 1A-1C) may perform the steps of process 200.

As shown in block 202, the process flow 200 may include the step of receiving data associated with at least one available data center (which may also be referred to as a "datacenter"), wherein the at least one available data center is associated with a primary network. In some embodiments, the data center transmission system may receive data associated a plurality of data centers at the time a data transmission is also received, whereby the data center transmission system may receive data regarding the current data transmissions handled and/or currently being received by each of the data centers of the plurality of data centers in the primary network.

In some embodiments, the data center transmission system may receive data regarding each of the data centers associated with a particular network, such as a particular network managed and/or operated by a particular entity. For instance, and in some embodiments, the data center transmission system may receive data regarding a plurality of data centers associated a primary network, where the primary network may be managed, used, operated, and/or the like, by a primary entity (e.g., such as a financial institution associated with the received data transmission, like a recipient financial institution associated with the received data transmission). In some embodiments, the data center transmission system may receive data associated with a plurality of data centers, which may be associated with a plurality of networks (e.g., a primary or first network, a secondary or second network, a third network, . . . an nth network, and/or the like).

In some embodiments, the data center transmission system may receive data regarding the plurality of data centers associated with at least one network (e.g., a primary network, a secondary network, and/or the like) by receiving the data from the at least one network, by tracking previous data transmissions to the plurality of data centers, from the entities associated with the plurality of networks, and/or the like. For instance, and in some embodiments, the data center transmission system may receive such data based on a plurality of data center identifiers which are used for previous data transmissions, whereby the data center identifiers may comprise unique alphanumeric strings which uniquely identify each data center within the particular network and/or within other networks, such as within a distributed network. In some embodiments, the data center transmission system may store each of these data center identifiers associated with each network in a data center identifier database, which may comprise the data center identifiers for each network; the associated network; the associated entity managing, using, or operating the network; and/or the like. Such a data center identifier database may be used by the data center transmission system to determine which data centers need to be assessed for a particular network. Such data centers for a particular network (e.g., a primary network, a secondary network, . . . an nth network, and/or the like) may be identified by the data center transmission system, such that the data center transmission system can determine the available data centers in the network (i.e., the data centers which are available for transmission and/or are powered and on).

In some embodiments, the primary network may be associated with a primary entity, such as a financial institution, and/or the like. For instance, the primary entity may be owned, managed, and/or used by a primary entity, such as by a particular financial institution that is identified in a resource distribution as being associated with an intended recipient of a resource distribution or resource transaction. In this manner, the primary entity may be identified based on the data transmission and its associated intended recipient (e.g., recipient of the resource distribution associated with the data transmission), where the data transmission may comprise a particular resource account of the resource distribution and the resource account may be associated with a particular entity (e.g., managed by the primary entity) and the recipient account of the recipient (e.g., managed by the primary entity).

In some embodiments, the primary network and a secondary network may be part of a distributed network. Further, and in some embodiments, the primary network and the secondary network may be part of a peer-to-peer resource sharing distribution network, where each network (e.g., primary network, secondary network, third network, . . . nth network, and/or the like) may be part of the distributed network and may comprise secured resource sharing between the networks. In some embodiments, each of the networks described herein (e.g., secondary network, third network, . . . nth network, and/or the like) may comprise similar or the same components as those described herein for the primary network (e.g. load balancers including a DMZ load balancer, internal network load balancer(s), data center(s), and/or the like). Indeed, such similar components for the secondary network are described in further detail below with respect to the same or similar components of the primary network.

As shown in block 204, the process flow 200 may include the step of receiving a data transmission, wherein the data transmission is associated with a data center of the primary network. In some embodiments, the data center transmission system may receive a data transmission from a network, such as network 110 of FIG. 1, as the data transmission is transmitted to a primary network, secondary network, and/or the like. For instance, the data center transmission system may track or identify each of the data transmissions transmitted through the network 110 and to each network (e.g., a primary network, secondary network, and/or the like) and receive data regarding or associated with each data transmission.

In some embodiments, the data transmission received by the data center transmission system (e.g., tracked or identified by the data center transmission system) may be associated with a particular data center of a particular entity, such as a data center associated with a primary entity. Such a particular data center may be identified by the data center transmission system by parsing the data of the data transmission to determine an intended data center transmission end-location, such as parsing the data of the data transmission to determine a data center identifier.

As shown in block 206, the process flow 200 may include the step of uploading the data transmission to a demilitarized zone (also referred to herein as "DMZ"), wherein the DMZ comprises a demilitarized zone load balancer (also referred to herein as "DMZ load balancer") of the primary network. In some embodiments, the data center transmission system may upload the data transmission received to a DMZ associated with the primary network to a DMZ load balancer comprised within the DMZ. Thus, and in some embodiments, the DMZ load balancer may distribute and/or transmit the data transmission to an associated available internal network (e.g., an available primary internal network) based on a determination that the associated available internal network is currently available to accept the data transmission and is not overloaded. Such a DMZ load balancer may determine the associated available internal network of a primary network (or a secondary network where the DMZ is in a secondary network, and/or the like).

By way of non-limiting example, a secondary network-which may be in communication with the primary network—may comprise a secondary demilitarized zone (secondary DMZ), where the secondary DMZ may further comprise a secondary demilitarized zone load balancer (secondary DMZ load balancer). Such a secondary DMZ and secondary DMZ load balancer may comprise all the same and/or similar capabilities as the primary DMZ and primary DMZ load balancer as herein described.

As shown in block 208, the process flow 200 may include the step of applying the data transmission to the DMZ load balancer to generate a demilitarized data transmission (DMZ data transmission). In some embodiments, the data center transmission system may apply the data transmission to the DMZ load balancer to at least generate a DMZ data transmission which is transmitted to an internal network associated with the primary network (i.e., a primary internal network).

By way of non-limiting example, the DMZ data transmission is the original data transmission (e.g., the data transmission of block 206), which has been applied to the DMZ load balancer in the demilitarized zone. Thus, the DMZ data transmission comprises all the same data as the original data transmission. Such a DMZ data transmission may not include any change in logic, identifiers of data center recipients, data, and/or the like from the data transmission (i.e., the original data transmission applied to the DMZ load balancer).

As shown in block 210, the process flow 200 may include the step of determining, by the DMZ load balancer, an available primary internal network of the primary network. In some embodiments, the data center transmission system may determine, by the DMZ load balancer, an available primary internal network of the primary network based on the current data transmissions at each of the primary internal networks. Thus, and in some embodiments, the DMZ load balancer may be tasked with determining an available primary internal network to send the data transmission (the DMZ data transmission), whereby the available primary internal network is determined by the data center transmission system as at least one primary internal network that can receive the DMZ data transmission and apply the DMZ data transmission to a load balancer (e.g., a primary internal network load balancer) the quickest of a plurality of primary internal networks. Thus, and in some embodiments, the data center transmission system may compare the current data transmissions at each primary internal network associated with the primary network in order to determine the fastest route for the data transmission to be transmitted to a data center.

In some embodiments, the data center transmission system may determine the available internal network of the network (e.g., the available primary internal network of the primary network) by tracking each of the data transmissions transmitted to each of the internal networks associated with the network and determining which internal network has the least data transmissions at a current time. Such a current time may comprise the last thirty seconds, the last minute, the last five minutes, the last ten minutes, the last thirty minutes, the last hour, and/or the like.

As used herein, the term "internal network" (such as that of the primary internal network, the secondary internal network, and/or the like) may refer to a server of the network, a processor, and/or the like, which may be configured to receive data transmissions and determine a data center to transmit the data transmissions to. In some embodiments, the network (e.g., the primary network, the secondary network, and/or the like) may comprise only a singular internal network (e.g., a singular primary internal network, a singular secondary internal network, and/or the like), a plurality of internal networks, and/or the like.

As shown in block 212, the process flow 200 may include the step of transmitting the DMZ data transmission to the available primary internal network, wherein the available primary internal network comprises a primary internal network load balancer. In some embodiments, the data center transmission system may transmit the DMZ data transmission to the available primary internal network of the primary network based on the determination the available primary internal network has availability or capacity to apply the DMZ data transmission to a primary internal network load balancer the quickest of the primary internal network(s) and their associated primary internal network load balancer(s).

Similarly, and in some embodiments, the data center transmission system may comprise a secondary network that further comprises at least one secondary internal network. In some embodiments, each secondary internal network of the at least one secondary internal network may further comprise a secondary internal network load balancer which may be tasked with determining a data center of the secondary network to send a secondary internal network data transmission (i.e., the original data transmission after being applied to an internal network load balancer).

In some embodiments, the receipt of the data transmission to be transmitted to the at least one data center from the internal network may be received after the DMZ data transmission is generated. Thus, the DMZ data transmission is generated from the original data transmission after the original data transmission is applied to the DMZ load balancer, but before the data transmission is transmitted to a data center. In some further embodiments, the data center is determined and/or selected before the application of the DMZ data transmission to the internal network load balancer, such as the primary internal network load balancer, the secondary internal network load balancer, and/or the like.

As shown in block 214, the process flow 200 may include the step of applying the DMZ data transmission to the primary internal network load balancer to generate a primary internal network data transmission. In some embodiments, the data center transmission system may apply the DMZ data transmission to the primary internal network load balancer to determine an available data center to transmit the original data transmission. Thus, and in some embodiments, the generation of the primary internal network data transmission is the original data transmission after it has been applied to the primary internal network load balancer, where the primary internal network data transmission comprises the same data as the original data transmission and the DMZ data transmission. For instance, the DMZ data transmission and the internal network data transmission may comprise the same logic, identifiers, and/or the like of the original data transmission such that the data itself of the data transmission is not changed, but the data center the data transmission will be transmitted to may dynamically be determined by the data center transmission system in real-time.

As shown in block 216, the process flow 200 may include the step of determining, by the primary internal network load balancer, a selected data center from the at least one available data center. In some embodiments, the data center transmission system may—after applying the DMZ data transmission to the primary internal network load balancer—determine an available data center of the associated network based on a determination that at least one data center of the associated network is currently available to receive the data transmission (e.g., the primary internal network data transmission). In some embodiments, the data center transmission system may determine the number of current data transmissions at each data center associated with the network (e.g., primary network) by tracking each of the data transmissions from each of the internal networks associated the network that received the data transmission.

In some embodiments, the data center transmission system will determine the selected data center for transmitting the primary internal network data transmission to the data center comprising the least number of current data transmissions (e.g., the least number of current primary internal network data transmissions) at the current time. For instance, the data center transmission system may track each of the data transmissions received by the network (e.g., the primary network) and each of the data centers that received each of the data transmissions within the network. Such an embodiment regarding the number of current data transmissions at each data center is described in further detail below with respect to FIG. 3.

In some embodiments, the primary internal network load balancer may determine the selected data center from a plurality of available data centers associated with the network. For instance, each network may comprise a plurality of data centers in communication with its internal network, a single data center in communication with its internal network, and/or the like. Thus, and in some embodiments, and where there is a single data center in communication with the network's internal network, the data center transmission system may determine the single data center is the selected data center no matter the number of current data transmissions received by the single data center.

As shown in block 218, the process flow 200 may include the step of transmitting the primary internal network data transmission to the selected data center. In some embodiments, the data center transmission system may transmit the primary internal data transmission to the selected data center, whereby the selected data center is determined by the primary internal network load balancer. Such a selected data center may then process the data of the primary internal network data transmission (i.e., the data of the original data transmission), store the data of the primary internal network data transmission, disassemble the data of the primary internal network data transmission, and/or the like.

FIG. 3 illustrates a process flow 300 for determining the selected data center, in accordance with an embodiment of the invention. In some embodiments, a system (e.g., similar to one or more of the systems described herein with respect to FIGS. 1A-1C) may perform one or more of the steps of process flow 300. For example, a data center transmission system (e.g., the system 130 described herein with respect to FIG. 1A-1C) may perform the steps of process 300.

As shown in block 302, the process flow 300 may include the step of receiving data associated with the current data transmission for each data center of the plurality of data centers. In some embodiments, the data center transmission system may receive data associated with a current data transmission for each data center of the plurality of data centers by tracking each of the data transmissions transmitted to each of the data centers in a network (e.g., each of the data centers of the primary network, each of the data centers of the secondary network, and/or the like). Thus, and in some embodiments, the data center transmission system may accurately track each of the data transmissions received by a network and transmitted within the network to a data center for processing, storing, disseminating, and/or the like. Thus, and in some embodiments, the data center transmission system may track each data transmission in real-time as the data is transmitted to each data center. In this manner, the data center transmission system may determine each of the data transmissions for each data center at a current time (e.g., those data transmissions currently being processed, stored, disseminated, and/or the like, at each data center).

As shown in block 304, the process flow 300 may include the step of comparing the data associated with the current data transmissions. In some embodiments, the data center transmission system may compare the data associated with each current data transmissions for each data center in the network to determine what each data center currently comprises for data transmissions. In this manner, the data center transmission system may first determine what each data center of the network currently comprises with respect to data transmissions. From there, the data center transmission system may then compare the number of current data transmissions at each data center of the network to determine which data center of the network comprises (e.g., is processing, is storing, is disseminating, and/or the like) the least number of current data transmissions. As used herein, the term "comparison," "compare," and/or "comparing" may refer to measuring each of the data transmissions received at each data center against other data transmissions received at other data centers in the network.

In some embodiments, the data center transmission system may consider the current data transmissions to be the data transmissions received in the previous ten seconds, previous thirty seconds, previous minute, previous two minutes, previous five minutes, previous ten minutes, previous fifteen minutes, previous thirty minutes, previous hour, and/or the like. In this manner, the data center transmission system may accurately track the load on each data center for a current time, where the current time may comprise a shortened period of time (e.g., previous ten seconds, previous thirty seconds, previous minute, previous two minutes, previous five minutes, and/or the like) and/or a longer period of time (e.g., previous ten minutes, previous fifteen minutes, previous thirty minutes, previous hour, and/or the like). Thus, and in some embodiments, the data center transmission system may accurately, efficiently, and dynamically determine which data center to transmit the data transmission to prevent delayed processing, storing, disseminating, and/or the like, and to prevent overburdening particular data centers of a network from having to process, store, and disseminate data of the data transmissions within the network.

As shown in block 306, the process flow 300 may include the step of determining, based on the comparison of the data associated with the current data transmissions, the selected data center, wherein the selected data center comprises a lowest number of current data transmissions. In some embodiments, the data center transmission system may determine the selected data center to transmit the data transmission (i.e., the primary internal network data transmission) based on the selected data center comprising the lowest number of current data transmissions as compared to the other data centers in the network.

FIG. 4 illustrates an exemplary block diagram 400 for dynamically determining data center transmissions by implementing load balancers in an electronic network, in accordance with an embodiment of the invention. In some embodiments, a system (e.g., similar to one or more of the systems described herein with respect to FIGS. 1A-1C) may perform one or more of the steps described with respect to FIG. 4 and the associated exemplary data transmissions. For example, a data center transmission system (e.g., the system 130 described herein with respect to FIG. 1A-1C) may perform the steps associated with FIG. 4.

By way of non-limiting example, FIG. 4 shows an exemplary diagram of a network (e.g., a primary network, a secondary network, and/or the like). For example, diagram 400 comprises a data transmission A 402, which may be referred to herein as the original data transmission, transmitted to a network (e.g., primary network 401). In some embodiments, the primary network 401 may comprise at least one demilitarized zone (DMZ 410), at least one internal network (e.g., internal network A 420, internal network B 430, . . . internal network N 440) of the primary network 401. In some embodiments, the primary network 401 may further comprise at least one data center and/or a plurality of data centers such as data center A 460, . . . data center N 470.

In some embodiments, and as disclosed herein, the DMZ 410 associated with the primary network 401 may further comprise at least one load balancer, DMZ load balancer A 412, which may be configured to determine an available internal network to transmit the data transmission (i.e., the DMZ data transmission). In some embodiments, such a transmission of the data transmission from the DMZ 410 to an available internal network may comprise a transmission of data through a firewall, such as firewall 415. By way of non-limiting example, each of the dashed lines from the DMZ load balancer 412 may indicate the potential path for the data transmission to take to reach an internal network load balancer.

In some embodiments, each of the internal networks of the primary network 401 may each further comprise an internal network load balancer, such as the internal network load balancer A 422 of internal network A 420; internal network load balancer B 432 of internal network B; . . . internal network load balancer N 444 of internal network N 440. Thus, and in some embodiments, after the DMZ data transmission has been transmitted to the available internal network (e.g., to one of internal network A 420, internal network B 430, . . . internal network N 440), the data center transmission system may use the associated internal network load balancer of the available internal network to determine an available data center (i.e., a selected data center) to transmit the data transmission (i.e., the primary internal network data transmission). In some embodiments, the data transmission from the internal network load balancer (e.g., the internal network data transmission from at least one of internal network load balancer A of internal network A 420; internal network load balancer B 432 of internal network B; or . . . internal network load balancer N 444 of internal network N 440 may first be transmitted through a firewall, such as firewall 455 of the primary network 401.

Thus, and as shown in FIG. 4, each of the dashed and/or dotted lines between each of the internal networks (e.g., internal network A 420, internal network B 430, . . . internal network N 440) may indicate a potential transmission path for the data transmission to take to a data center of the network (e.g., primary network 401), such as the selected data center for the data transmission.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically determining data center transmissions, the system comprising:
 a memory device with computer-readable program code stored thereon;
 at least one processing device operatively coupled to the at least one memory device and the at least one communication device, wherein executing the computer-readable code is configured to cause the at least one processing device to:
 receive a data transmission, wherein the data transmission is associated with a data center of a primary network;
 upload the data transmission to a demilitarized zone (DMZ), wherein the DMZ comprises a demilitarized zone load balancer (DMZ load balancer);
 apply the data transmission to the DMZ load balancer to generate a demilitarized data transmission (DMZ data transmission);

determine, based on an output of the DMZ load balancer, an available primary internal network of the primary network;
transmit the DMZ data transmission to the available primary internal network, wherein the available primary internal network comprises a primary internal network load balancer;
apply the DMZ data transmission to the primary internal network load balancer to generate a primary internal network data transmission;
determine, based on an output of the primary internal network load balancer, a selected data center associated with the primary network; and
transmit the primary internal network data transmission to the selected data center.

2. The system of claim 1, wherein the selected data center is determined based on a number of current data transmissions for a plurality of data centers associated with the primary network.

3. The system of claim 2, wherein the at least one processing device is further configured to:
receive data associated with the current data transmissions for each data center of the plurality of data centers;
compare the data associated with the current data transmissions; and
determine, based on the comparison of the data associated with the current data transmissions, the selected data center, wherein the selected data center comprises a lowest number of current data transmissions.

4. The system of claim 1, wherein the primary network is associated with a primary entity.

5. The system of claim 1, wherein the primary network and a secondary network are part of a distributed network.

6. The system of claim 5, wherein the secondary network comprises a secondary internal network and a secondary demilitarized zone (secondary DMZ).

7. The system of claim 6, wherein the secondary DMZ comprises a secondary demilitarized zone load balancer (secondary DMZ load balancer) and wherein the secondary internal network comprises a secondary internal network load balancer.

8. The system of claim 5, wherein the secondary network is associated with a secondary entity.

9. The system of claim 1, wherein the receipt of data associated with the at least one available data center associated with the primary network is received after the DMZ data transmission is generated.

10. The system of claim 9, wherein the selected data center is determined before the application of the DMZ data transmission to the primary internal network load balancer.

11. A computer program product for dynamically determining data center transmissions, wherein the computer program product comprises at least one non-transitory computer-readable medium having computer-readable program code portions embodied therein, the computer-readable program code portions which when executed by a processing device are configured to cause a processor to:
receive a data transmission, wherein the data transmission is associated with a data center of a primary network;
upload the data transmission to a demilitarized zone (DMZ), wherein the DMZ comprises a demilitarized zone load balancer (DMZ load balancer);
apply the data transmission to the DMZ load balancer to generate a demilitarized data transmission (DMZ data transmission);
determine, based on an output of the DMZ load balancer, an available primary internal network of the primary network;
transmit the DMZ data transmission to the available primary internal network, wherein the available primary internal network comprises a primary internal network load balancer;
apply the DMZ data transmission to the primary internal network load balancer to generate a primary internal network data transmission;
determine, based on an output of the primary internal network load balancer, a selected data center associated with the primary network; and
transmit the primary internal network data transmission to the selected data center.

12. The computer program product of claim 11, wherein the selected data center is determined based on a number of current data transmissions for a plurality of data centers associated with the primary network.

13. The computer program product of claim 12, wherein the processing device is configured to cause the processor to:
receive data associated with the current data transmissions for each data center of the plurality of data centers;
compare the data associated with the current data transmissions; and
determine, based on the comparison of the data associated with the current data transmissions, the selected data center, wherein the selected data center comprises a lowest number of current data transmissions.

14. The computer program product of claim 11, wherein the receipt of data associated with the at least one available data center associated with the primary network is received after the DMZ data transmission is generated.

15. The computer program product of claim 14, wherein the selected data center is determined before the application of the DMZ data transmission to the primary internal network load balancer.

16. A computer-implemented method for dynamically determining data center transmissions, the computer-implemented method comprising:
receiving a data transmission, wherein the data transmission is associated with a data center of a primary network;
uploading the data transmission to a demilitarized zone (DMZ), wherein the DMZ comprises a demilitarized zone load balancer (DMZ load balancer);
applying the data transmission to the DMZ load balancer to generate a demilitarized data transmission (DMZ data transmission);
determining, based on an output of the DMZ load balancer, an available primary internal network of the primary network;
transmitting the DMZ data transmission to the available primary internal network, wherein the available primary internal network comprises a primary internal network load balancer;
applying the DMZ data transmission to the primary internal network load balancer to generate a primary internal network data transmission;
determining, based on an output of the primary internal network load balancer, a selected data center associated with the primary network; and
transmitting the primary internal network data transmission to the selected data center.

17. The computer-implemented method of claim 16, wherein the selected data center is determined based on a number of current data transmissions for a plurality of data centers associated with the primary network.

18. The computer-implemented method of claim 17, further comprising:
- receiving data associated with the current data transmissions for each data center of the plurality of data centers;
- comparing the data associated with the current data transmissions; and
- determining, based on the comparison of the data associated with the current data transmissions, the selected data center, wherein the selected data center comprises a lowest number of current data transmissions.

19. The computer-implemented method of claim 16, wherein the receipt of data associated with the at least one available data center associated with the primary network is received after the DMZ data transmission is generated.

20. The computer-implemented method of claim 19, wherein the selected data center is determined before the application of the DMZ data transmission to the primary internal network load balancer.

* * * * *